July 25, 1933.  R. MACK  1,920,016
MILK DISPENSER
Filed July 21, 1930   2 Sheets-Sheet 2
Fig. 3.
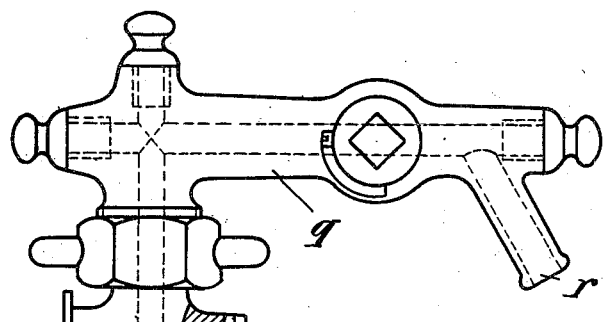
Fig. 4.
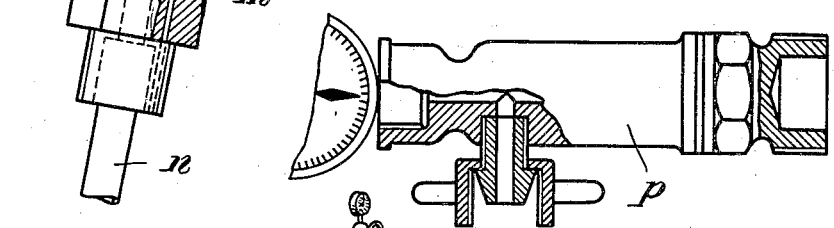
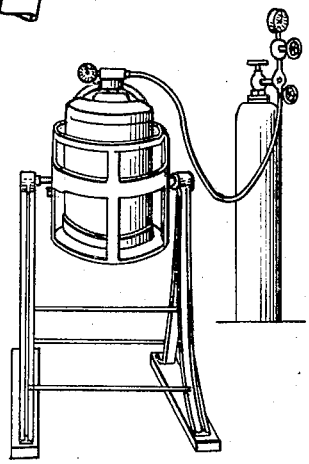
Fig. 5.
Inventor:
Reinhold Mack Patented July 25, 1933

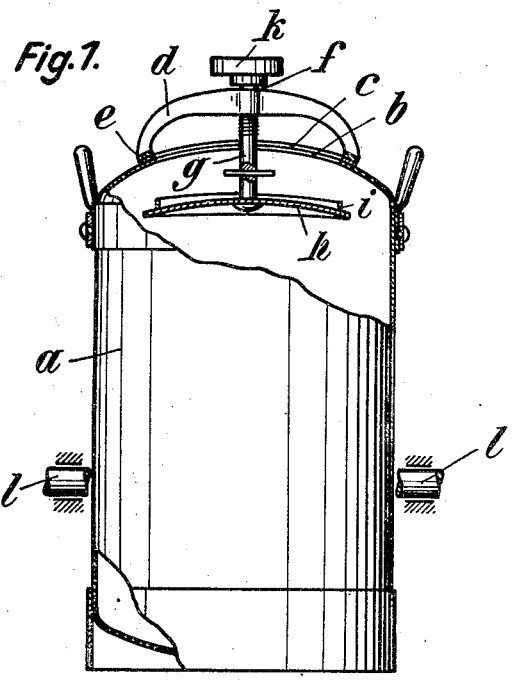
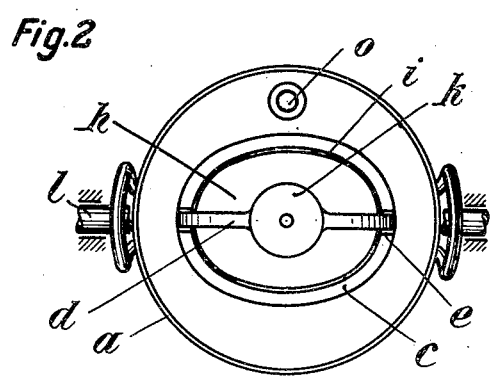

1,920,016

UNITED STATES PATENT OFFICE

REINHOLD MACK, OF GOPPINGEN, GERMANY

MILK DISPENSER

Application filed July 21, 1930. Serial No. 469,529.

This invention refers to an apparatus for treating liquids, and relates more particularly to an apparatus for carrying out a process for mixing milk with carbon dioxide gas and consists of a container oscillatable around a horizontal axle, which container has in its upper end an oval aperture for filling in the milk, the aperture being bridged over by a strap, which guides by means of a screw thread a lid situated inside the container, and having a shape corresponding to that of the aperture. By means of a star nut the lid can be screwed into the aperture by hand, thereby producing a temporary closure. A reliable hermetic closure of the vessel is then obtained, when the gas pressure occurring in the vessel also acts.

The fittings for introducing the milk and the carbon dioxide and exhausting the air and drawing off the drink produced consist substantially of a four-way cock connected with the riser tube and let into the domed head of the vessel. A T-shaped connecting piece and a draw off cock are alternately fitted on this four-way cock by means of a cap nut, the T-piece having a pressure gauge fitted on one of its outlets, the other outlet being connected with the carbon dioxide bottle.

An embodiment of the invention is illustrated by way of example in the accompanying drawings.

Fig. 1 shows a general view of the apparatus.

Fig. 2 is a top plan view of Fig. 1.

Figs. 3 and 4 show parts of the fittings for the apparatus.

Fig. 5 is a perspective view of the complete apparatus.

The cylindrical vessel $a$ has an oval aperture $b$ in its domed upper end, the edge of which aperture being reinforced by a flange ring $c$ and bridged by a removable bow $d$ engaging with two guide grooves $e$. The bow has at the middle a screw thread $f$ in which a bolt $g$ is screwed which carries the lid $h$. The lid $h$ has a domed part $i$ which fits into the oval aperture $b$. A star nut $k$ adapted to be operated by hand serves to screw the lid into the aperture.

The vessel is arranged in such a manner for effecting oscillating movements that it is surrounded by a cage, the side parts $l$ of which are mounted in a swivelled bracket. The oscillating movements of the apparatus can be effected by means of a hand crank. The fittings consist of a four-way cock $m$ connected with a riser tube $n$ and let into the vessel, for example at $o$. The cock $m$ can be closed or opened by means of a plug key. A T-piece $p$ or a draw off cock $q$ are alternately fixed to the four-way cock $m$.

The cock $q$, which serves for drawing off the drink, has an outlet $r$.

For introducing the carbon dioxide into the vessel the four-way cock $m$ is opened by means of a key in such a manner that the connection between the riser tube $n$ and the T-piece $p$ to be fitted on is established. The carbon dioxide flows through the riser tube $n$ and on leaving same upward under pressure through the milk. Owing to this procedure the air contained in the milk will be forced into the empty space and discharged through the discharge passage of the four-way cock, so that a small percentage of carbon dioxide gas is admixed to the milk before the mixture flows through the discharge passage of the cock.

After oscillating the vessel, the four-way cock rigidly mounted on the vessel is closed by means of the key, the T-piece removed, and the draw off cock $q$ screwed on in its stead.

I claim:—

1. An apparatus for treating liquids, comprising a vessel, means connected with said vessel for oscillating the same, a lid for an opening formed in said vessel, means connected with said vessel for reciprocating said lid to cover and uncover said opening, a riser tube fitting into another opening of said vessel, and a four-way cock connected with said riser tube, the last-mentioned four-way cock being adapted to transmit gas introduced into and discharged from said vessel as well as a liquid drawn out of said vessel.

2. An apparatus for treating liquids, comprising a vessel, means connected with said vessel for oscillating the same, a lid for an opening formed in said vessel, means connected with said vessel for reciprocating said lid to cover and uncover said opening, a riser tube fitting into another opening of said vessel, a four-way cock connected with said riser tube, the last-mentioned four-way cock being adapted to transmit gas introduced into and discharged from said vessel as well as a liquid drawn out of said vessel, and a draw off cock adapted to be screwed into said four-way cock.

3. An apparatus for treating liquids, comprising a vessel, means connected with said vessel for oscillating the same, a lid for an opening formed in said vessel, means connected with said vessel for reciprocating said lid to cover and uncover said opening, a riser tube fitting into another opening of said vessel, a four-way cock connected with said riser tube, said four-way cock being adapted to transmit gas introduced into and discharged from said vessel as well as a liquid drawn out of said vessel, a connecting piece having a portion adapted to be screwed into said four-way cock, and a pressure gauge carried by said connecting piece.

REINHOLD MACK.